UNITED STATES PATENT OFFICE.

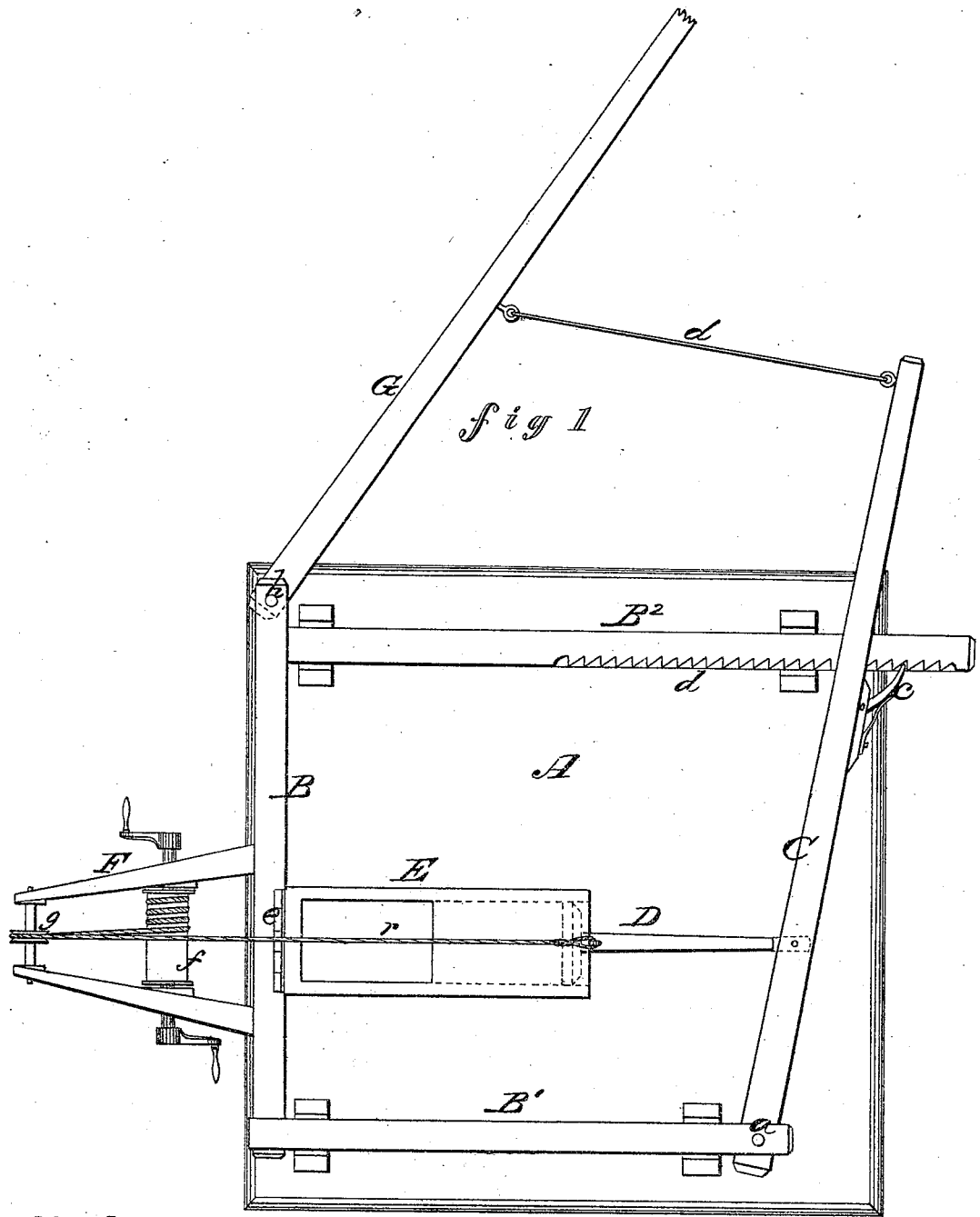

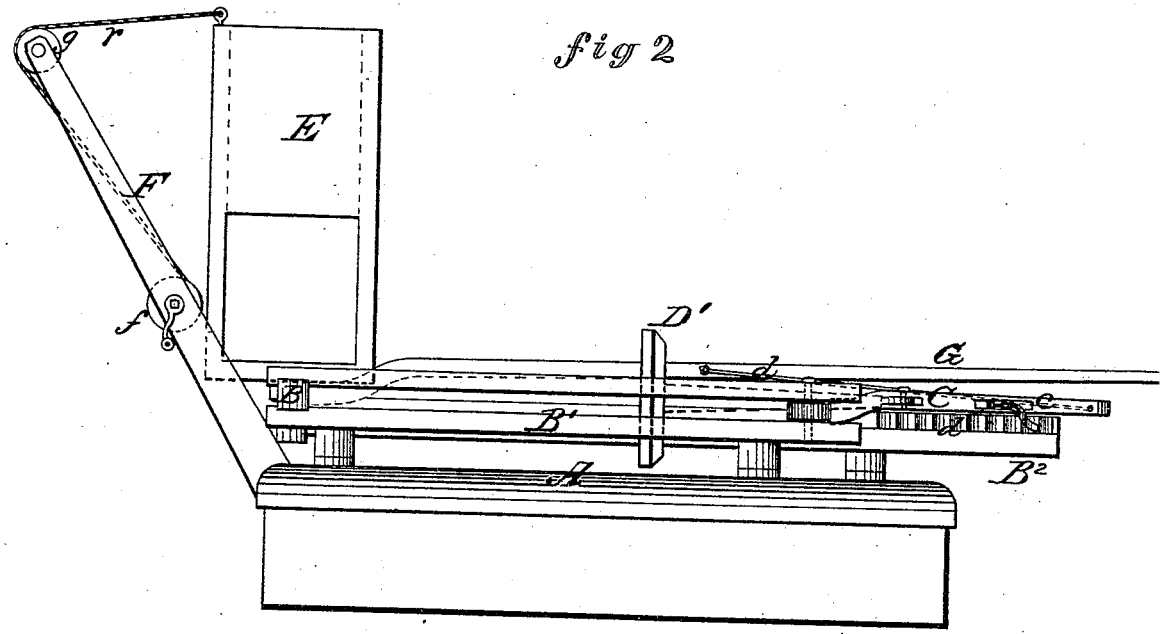

FRANK S. HYDE, OF RUTHERFORD, TENNESSEE.

IMPROVEMENT IN COTTON-PRESSES.

Specification forming part of Letters Patent No. 151,594, dated June 2, 1874; application filed April 18, 1874.

*To all whom it may concern:*

Be it known that I, FRANK S. HYDE, of Rutherford, in the county of Gibson and State of Tennessee, have invented a new and valuable Improvement in Cotton-Presses; and I do hereby declare that the following is a full, clear, and exact description of the construction and operation of the same, reference being had to the annexed drawings making a part of this specification, and to the letters and figures of reference marked thereon.

Figure 1 of the drawings is a representation of a plan view of my cotton-press, and Fig. 2 is a side view of the same.

This invention has relation to machines for pressing cotton, hay, and other analogous substances; and it consists in a derrick having a windlass combined with a hinged press-box and horizontal levers; also, the combination of pawl, lever-ratchet, sweep-lever, and hinged press-box, as will be hereinafter more fully explained.

In the annexed drawings, A represents a foundation, on which the press mechanism is constructed. B B$^1$ B$^2$ are beams, which are arranged horizontally and suitably secured upon said foundation at right angles to each other. To the beam B$^1$ at $a$ I pivot one end of a long lever, C, which extends over the beam B$^2$, and is connected by a rod, $d$, to a sweep-lever, G, which is pivoted at $h$ to the beam B. D', Fig. 2, designates a follower or pressing-head, which is secured on the end of a rod, D, pivoted to the lever C. This follower is intended to work in a press-box, E, which is hinged in a substantial manner to the fixed beam B, and constructed to be filled through its upper end, the pressed bale being removed through one of the four openings at its hinged end. The press-box E is raised from a horizontal to a perpendicular position, and lowered to the horizontal position shown in Fig. 1 by means of a rope or chain, $r$, which is attached to the free end of this box and passed over a pulley, $g$, at the upper end of a derrick, F, and thence carried down and passed around a windlass, $f$. The animals are hitched to the sweep-lever G, and walk in the arc of a circle coincident to the pivot $h$, thereby drawing directly upon the lever C, and forcing the follower D' into the press-box when this box is arranged horizontally, as shown in Fig. 1. During the pressing operation the pawl $c$, which is applied to the lever C, will engage with teeth $d$ formed on the beam B$^2$, and retain this lever with its follower in the position to which it is drawn. When the required pressure has been applied to the material in the press-box the bale is properly bound and removed, the follower is withdrawn, and the press-box is erected to be refilled for repeating the operation.

What I claim, and desire to secure by Letters Patent, is—

1. A derrick, F, with a windlass attached, combined with a hinged press-box and horizontal sweep-levers, substantially as described.

2. The combination of the pawl $c$ on lever C, the ratchet $d$ on beam B$^2$, the sweep-lever G, and a hinged press-box, E, in the manner and for the purposes described.

In testimony that I claim the above I have hereunto subscribed my name in the presence of two witnesses.

FRANK SULE HYDE.

Witnesses:
 J. A. MCCARROLL,
 W. P. ELROD.